US010694004B2

(12) United States Patent
Matsumoto

(10) Patent No.: US 10,694,004 B2
(45) Date of Patent: Jun. 23, 2020

(54) COMMUNICATION APPARATUS, CONTROL METHOD AND STORAGE MEDIUM

(71) Applicant: CANON KABUSHIKI KAISHA, Tokyo (JP)

(72) Inventor: Akinobu Matsumoto, Kariya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/129,077

(22) Filed: Sep. 12, 2018

(65) Prior Publication Data
US 2019/0082037 A1 Mar. 14, 2019

(30) Foreign Application Priority Data

Sep. 13, 2017 (JP) ................. 2017-176091

(51) Int. Cl.
H04L 29/06 (2006.01)
H04L 12/721 (2013.01)
H04L 29/12 (2006.01)
(52) U.S. Cl.
CPC ............ H04L 69/161 (2013.01); H04L 45/38 (2013.01); H04L 61/6059 (2013.01); H04L 69/08 (2013.01); H04L 69/163 (2013.01); H04L 69/22 (2013.01)
(58) Field of Classification Search
None
See application file for complete search history.

(56) References Cited

U.S. PATENT DOCUMENTS

| 5,896,383 A * | 4/1999 | Wakeland ............... H04L 29/06 370/400 |
| 2009/0316628 A1* | 12/2009 | Enns ................. H04L 12/40006 370/328 |
| 2016/0085594 A1* | 3/2016 | Wang ..................... H04L 67/18 709/226 |

FOREIGN PATENT DOCUMENTS

JP 2012-124758 A 6/2012

* cited by examiner

*Primary Examiner* — Eunsook Choi
(74) *Attorney, Agent, or Firm* — Canon U.S.A., Inc., IP Division

(57) ABSTRACT

An apparatus and method is disclosed in which a frame format of a data frame received from a network conforming to a first communication scheme is converted into a frame format of a second network conforming to a different communication scheme, and the data frame is transferred according to a transfer rule applicable to the data frame of the frame format. A communication apparatus converts a frame format of a data frame received from a first network into a frame format conforming to a second communication scheme. Further, the communication apparatus performs transfer processing of the converted data frame according to a transfer rule that includes a pair of a transfer condition of the data frame and transfer processing, which is executed in a case where the transfer condition applicable to the data frame conforming to the second communication scheme, is satisfied.

11 Claims, 13 Drawing Sheets

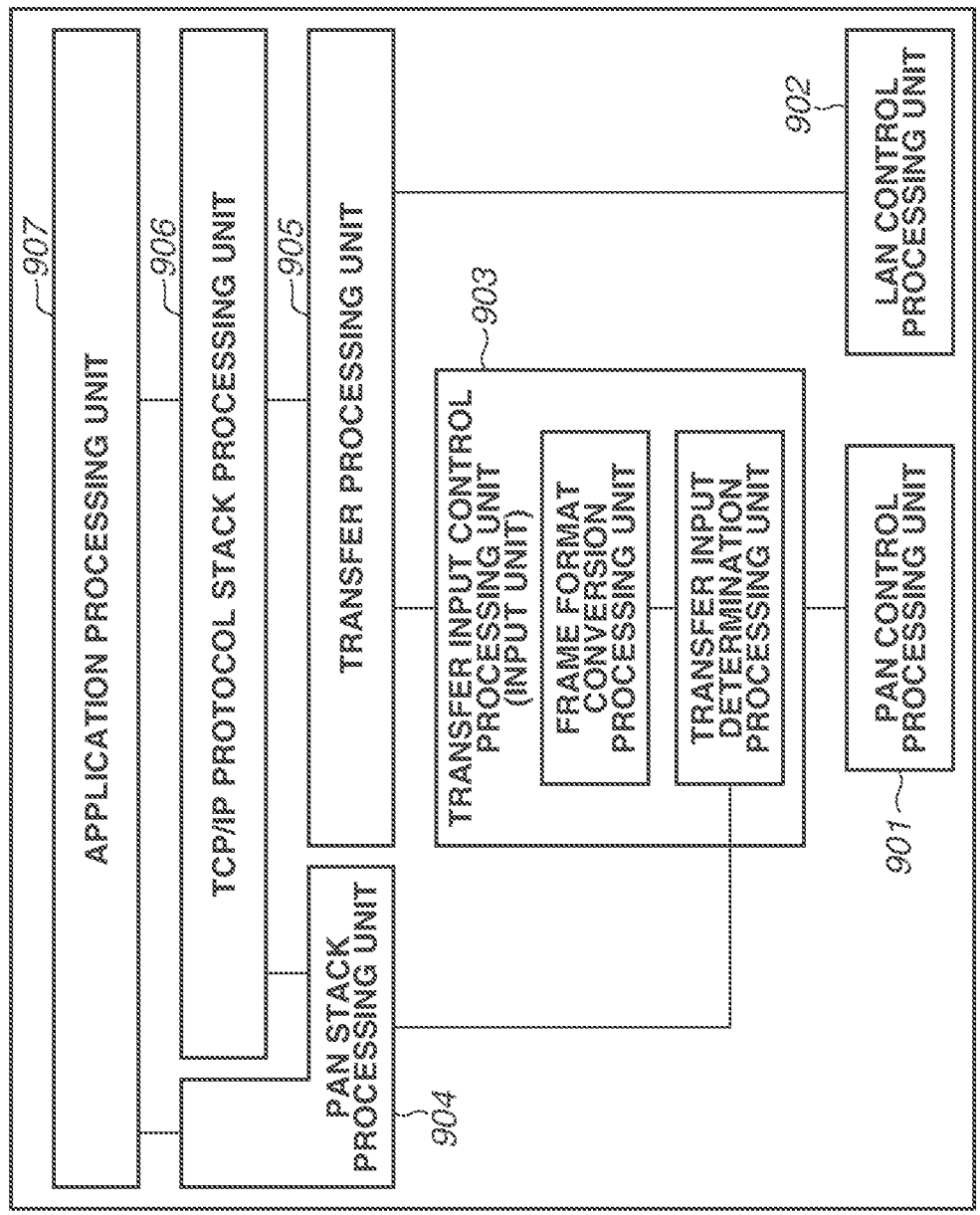

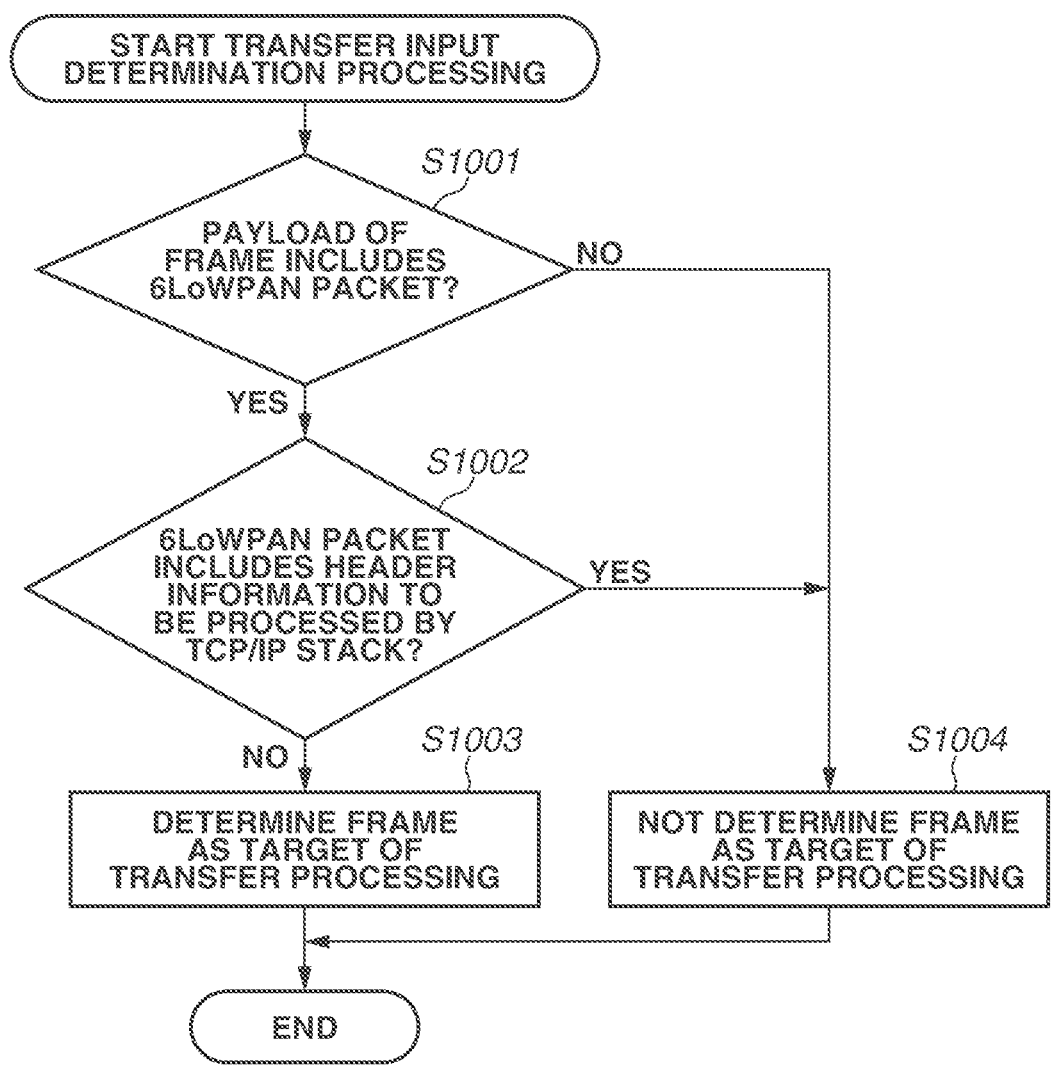

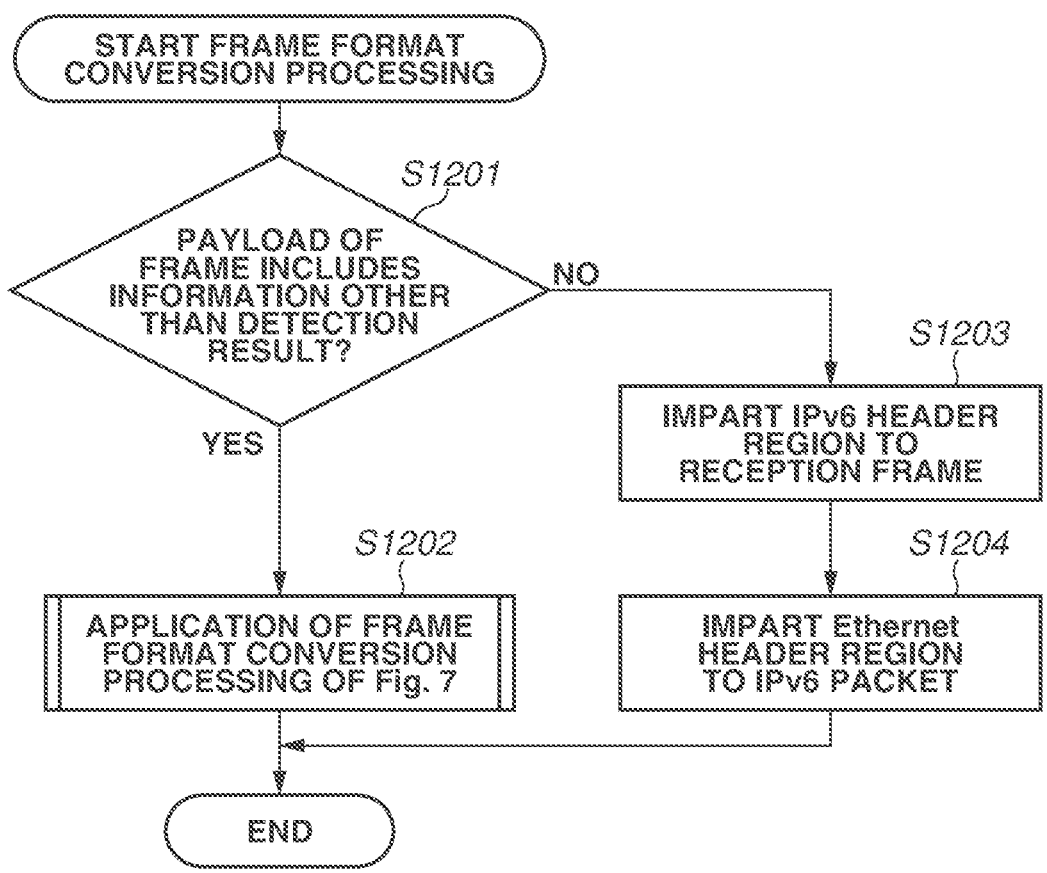

COMMUNICATION APPARATUS, CONTROL METHOD AND STORAGE MEDIUM

BACKGROUND OF THE INVENTION

Field of the Invention

The present invention relates to a relay apparatus that performs data transfer between networks, and to a data transfer method.

Description of the Related Art

In recent years, Internet of Things (hereinafter, IoT) has been applied to various fields. Under such circumstances, cases where sensor data acquired from a large number of sensors is transferred through a sensor network are increased.

Such a sensor network is often configured using a communication standard classified into a wireless personal area network (hereinafter, WPAN) such as ZigBee (registered trademark), Wireless Smart Utility Network (Wi-SUN, registered trademark), and Bluetooth (registered trademark).

The number of cases where a relay apparatus that relays the sensor data transferred through such a sensor network, to a local area network (LAN) constructing an Internet protocol (IP) network, is increased. Such a relay apparatus is called IoT gateway (hereinafter, IoT-GW). The IoT-GW transfers the sensor data to a server, etc. on the LAN.

For the IoT-GW that relays data between networks configured using different communication standards, relay processing involving conversion of a communication protocol is necessary. In Japanese Patent Application Laid-Open No. 2012-124758, the relay processing involving the conversion of a communication protocol is realized by an application running on a communication apparatus. Further, in United States Patent Publication Application No. 2009/0316628, such relay processing is realized by additionally providing a relay layer that converts the communication protocol and the relay processing, at an tipper layer of a network layer of two protocol stacks that process different communication protocols.

On the other hand, in recent years, in a network which requires flexible transfer control of a huge amount of data, a technology relating to software defined networking (SDN) that manages the network by software has been widely used. Among such technologies, a technology called OpenFlow (registered trademark) can collectively manage data transfer control by separately providing a data transfer device (OpenFlow switch) and a control device (OpenFlow controller) for controlling the data transfer device.

In the OpenFlow technology, a transfer rule called flow information is transmitted from the OpenFlow controller to the OpenFlow switch. The OpenFlow switch that has received the flow information stores the flow information in a flow table, and performs data transfer processing with reference to the flow table. The flow information includes a condition (matching rule) for determining whether to transfer the received data, and a group of processing (action list) that is performed in a case where the received data adapts to the matching rule.

While the sensor network performs communication conforming to a communication standard classified into WPAN such as ZigBee (registered trademark) and Wi-SUN (registered trademark), the OpenFlow technology is a transfer control technology in the IP network such as Ethernet (registered trademark) and wireless LAN (WLAN). Accordingly, the OpenFlow switch cannot perform analysis of the sensor data received from the sensor network because of difference in standard, and as a result, the data cannot be transferred by the OpenFlow technology.

SUMMARY OF THE INVENTION

Embodiments of the present invention are directed to a technology in which a frame format of a data frame received from a network conforming to a first communication scheme is converted into a frame format of a second network conforming to a different communication scheme, and the data frame can be transferred according to a transfer rule applicable to the data frame of the frame format.

According to an aspect of the present invention, a communication apparatus includes one or more processors, and one or more memories including instructions that, when executed by the processor(s), cause the apparatus to receive a data frame of a frame format different from a frame format conforming to Ethernet, convert the frame format of the received data frame into the frame format conforming to Ethernet, and perform, on the data frame of the frame format converted into the frame format conforming to Ethernet, OpenFlow control to perform transfer processing based on a predetermined transfer rule.

Further features win become apparent from the following description of exemplary embodiments with reference to the attached drawings.

BRIEF DESCRIPTION OF THE DRAWINGS

FIG. 9 is a functional block diagram of a relay apparatus.

FIG. 10 is a flowchart of transfer input determination processing described in a second exemplary embodiment.

FIG. 12 is a flowchart of frame format conversion processing described in the third exemplary embodiment.

DESCRIPTION OF THE EMBODIMENTS

Exemplary embodiments of the present invention are described below with reference to drawings.

A first exemplary embodiment is described below with reference to drawings. All of combinations of features described in the following exemplary embodiments are not necessarily essential.

[System Configuration]

Figure 1:
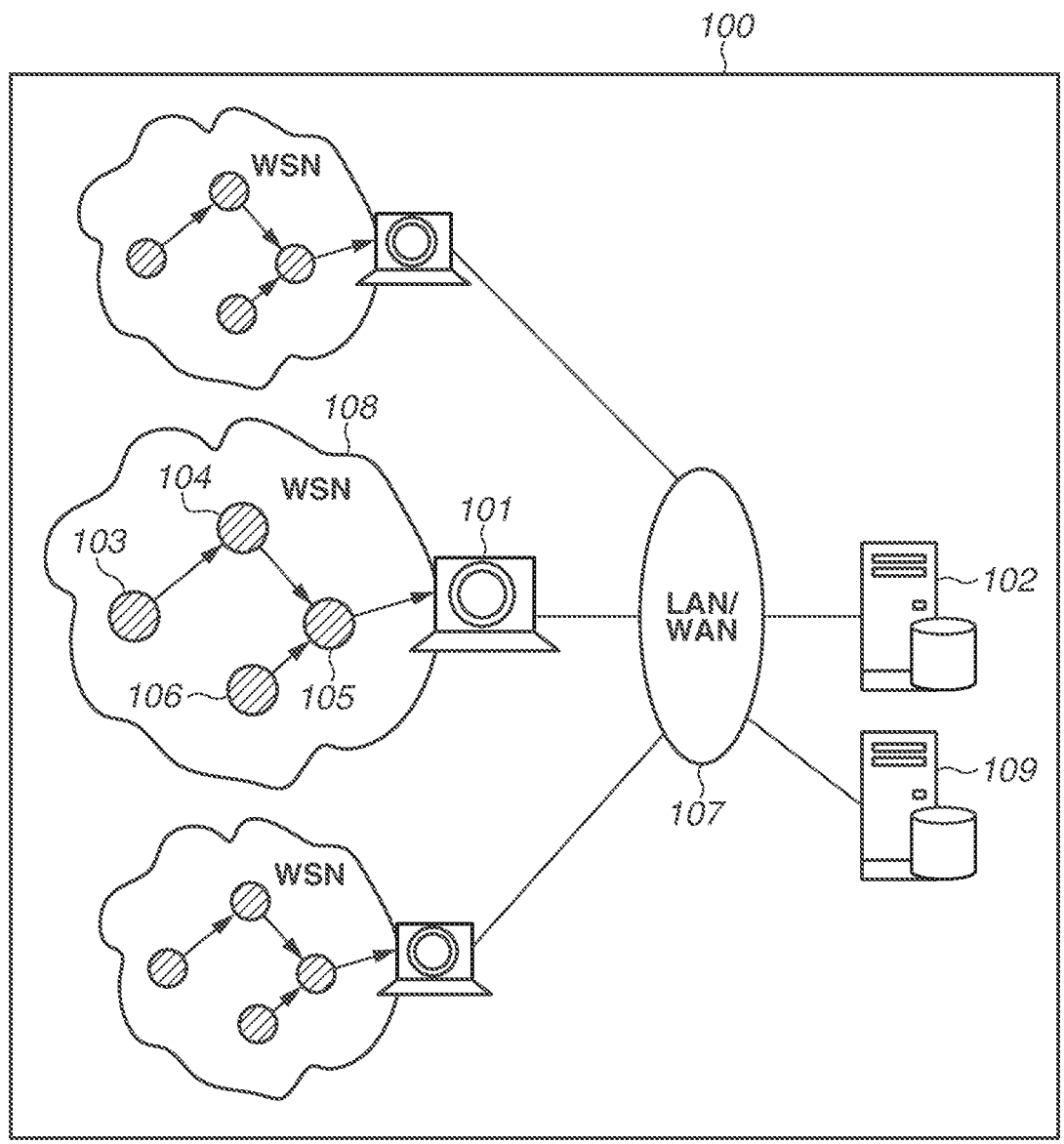
FIG. 1 is a system configuration diagram of an information processing system according to an exemplary embodiment.

FIG. 1 illustrates a configuration of an information processing system 100 according to the present exemplary embodiment. The information processing system 100 includes a wireless sensor network (WSN) 108 that includes sensors 103, 104, 105, and 106, a relay apparatus 101, a local area network/wide area network (LAN/WAN) 107, an image data processing apparatus 102, and a sensor data processing apparatus 109. The sensor is included in a concept of a "communication apparatus", and in the following, the "sensor" is used and described as an example of a communication apparatus connected to the WSN. Data other than the sensor data may be used with various embodiments, however, the following description is given with use of "sensor data". Moreover, a network other than the sensor network may be used with various embodiments; however, the following description is given with use of "sensor network". Likewise, an apparatus that processes data transmitted from the relay apparatus 101 is not limited to the sensor data processing apparatus, and an optional information processing apparatus is adoptable as long as the apparatus can perform the disclosed information processing. However, in the following, the apparatus is referred to as "sensor data processing apparatus" for the sake of convenience. The above description is similarly applied to other exemplary embodiments. In the present exemplary embodiment, the sensors 103, 104, 105, and 106 are generally referred to as the sensors 103 to 106. Further, at least one of the sensors 103 to 106 is described as the sensor 103 or simply described as the sensor.

The relay apparatus 101 is connected to the LAN/WAN 107 and the WSN 108. The connection between the relay apparatus 101 and the LAN/WAN 107 may be wired connection such as Ethernet (registered trademark), or wireless connection such as wireless LAN (WLAN) and a mobile communication line. Examples of the WLAN include Wi-Fi (conforming to IEEE802.11 series). In the present exemplary embodiment, Ethernet connection is described as an example of the connection between the relay apparatus 101 and the LAN/WAN 107, and conversion into Ethernet frame format is described below as an example of frame format conversion. Further, in an exemplary embodiment, a case where the relay apparatus 101 is connected to the image data processing apparatus 102 and the sensor data processing apparatus 109 through the LAN/WAN 107 is described; however, the relay apparatus 101 may be connected to the sensor data processing apparatus 109 through the WAN or the LAN. Moreover, it is assumed that a plurality of relay apparatuses 101 is connected to the image data processing apparatus 102 and the sensor data processing apparatus 109 through the LAN/WAN 107, and description is given while focusing on one of the plurality of relay apparatuses 101.

The relay apparatus 101 and the sensors 103 to 106 establish the WSN 108 as a mesh network through wireless personal area network (PAN) communication. The WSN 108 is not limited to the mesh network topology, and may be a star network centered about a predetermined device. The apparatuses configuring the WSN 108 are not limited to the relay apparatus 101 and the sensors 103 to 106, and may include a router that transfers a packet for other node, and other apparatuses.

Examples of a communication standard of the wireless PAN include Bluetooth (registered trademark), ZigBee (registered trademark), and Wireless Smart Utility Network (Wi-SUN, registered trademark). These communication standards each establish low-speed network with low power consumption. Therefore, these communication standards are suitable to establish a network (sensor network) including a sensor that is driven by a battery and transfers small data such as sensor data. In the WSN 108, communication is performed with a protocol of any of the wireless PAN standards. As a protocol for an upper layer, internet protocol version 6 (IPv6) over low-power wireless personal area networks (6LoWPAN) may be used. The 6LoWPAN is an IPv6 communication protocol suitable for a network in which the maximum unit size of a transmission/reception frame is small, such as the wireless PAN.

Each of the sensors 103 to 106 transmits a frame of the sensor data to the relay apparatus 101 through the WSN 108. The relay apparatus 101 functions as a gateway of the WSN 108 to the LAN/WAN 107. In other words, the relay apparatus 101 transmits, to the LAN/WAN 107 side, the frame transmitted from the inside of the WSN 108. Further, description is given assuming that the information processing system 100 according to the present exemplary embodiment performs communication based on IPv6 in the LAN/WAN 107. In other words, the relay apparatus 101 converts the frame of the sensor data of the protocol of the wireless PAN standard into an IPv6 packet to transfer the IPv6 packet.

In an exemplary embodiment, for example, the relay apparatus 101 serves as an apparatus that transmits, by streaming, a moving image captured by a network camera to the image data processing apparatus 102 through the LAN/WAN 107. As the streaming transmission protocol, real-time transport protocol (RTP) is used. The RTP is a protocol used for real-time image distribution such as live image distribution. The protocol used for transmission of the captured image from the relay apparatus 101 to the image data processing apparatus 102 is not limited to the RTF. In addition, the transmission of the captured image is not limited to the streaming transmission, and may be, for example, distribution of a moving image file. Further, the captured image to be transmitted by the relay apparatus 101 is not limited to the moving image, and may be a still image. Furthermore, the relay apparatus 101 may be, for example, a personal computer (PC), a smartphone, or a router, and may not include an imaging unit and may transmit a captured image received from outside.

The image data processing apparatus 102 receives the captured image that is transmitted from the relay apparatus 101 by streaming, and performs processing such as analysis, accumulation, and display of the image.

The sensor data processing apparatus 109 receives, through the relay apparatus 101, the frame of the sensor data transmitted from the sensors 103 to 106, and performs analysis and accumulation of the sensor data. Further, the sensor data processing apparatus 109 may display a result of the analysis of the sensor data, and may notify the relay apparatus 101 and the image data processing apparatus 102 of the result of the analysis of the sensor data.

The image data processing apparatus 102 and the sensor data processing apparatus 109 each may be, for example, a PC or a smartphone, or a server function constructed on a virtual infrastructure that is commonly called cloud.

Each of the sensors 103 to 106 included in the WSN 108 is an apparatus that can perform measurement of any value and event detection, for example, gyro, acceleration, orientation, distance, vibration, temperature, illuminance, ultraviolet rays (UV), atmospheric pressure, gas, radioactivity, smell, opening/closing of a door or a window, and intrusion detection. These sensors 103 to 106 each transmits, to the relay apparatus 101, a detection result including at least any of information indicating detection of a predetermined, event and numerical values obtained from the measurement. In addition, for example, the sensors 103 to 106 each may periodically transmit information indicating whether a predetermined environmental condition is satisfied, for example, whether temperature at an installation place is equal to or hither than a threshold. In actual transmission processing, the sensors 103 to 106 each transmit the sensor data that includes a destination address, etc. in addition to the detection result, as a transmission frame based on the communication standard of the WSN 108.

The detection result may include a detection result to be processed by the image data processing apparatus 102 in association with the captured image, and other detection result. The processing performed while the former detection result and the captured image are associated with each other is, for example, processing of performing control to display the captured image that has time information coincident with or similar to time information of the detection result received by the image data processing apparatus 102. The time information of the detection result is information indicating, for example, a time when the sensor performs the measurement, a time when a predetermined event is detected, or a time when the detection result is transmitted. The image data processing apparatus 102 performs such association processing, which allows a user to confirm, when the sensor detects occurrence of any event, the captured image that captures a situation of the occurred event. More specifically, for example, in a case where the image data processing apparatus 102 receives a detection result indicating that the sensor detects opening/closing of a door, the captured images obtained by imaging the vicinity of the door before and after a time of the detection are displayed on a display unit. Moreover, the processing is not limited thereto, and the processing performed by the image data processing apparatus 102 while the captured image and the detection result are associated with each other may include processing of recording the captured image that is selected according to the time information of the detection result, or processing of performing image analysis based on the detection result and the captured image.

For example, the sensor data processing apparatus 109 may designate which detection result to be associated with the captured image among the detection results from the sensors 103 to 106, for the relay apparatus 101. Likewise, the image data processing apparatus 102 may designate a detection result for the relay apparatus 101. Further, a user of die relay apparatus 101 may designate a detection result or an application in the relay apparatus 101 may automatically designate a detection result.

In an exemplary embodiment, the sensor data processing apparatus 109 determines whether the detection result is associated with the captured image, and designates a transfer destination of the frame of the sensor data including the detection result. For example, the sensor data processing apparatus 109 may determine that the relay apparatus 101 associates an object to be captured or the detection result by the sensor placed within an imaging target area, with the captured image, and may determine that the relay apparatus 101 does not associate the detection result by the sensor placed at the other position, with the captured image. Alternatively, the sensor data processing apparatus 109 may determine that specific types of detection result such as vibration and intrusion detection are associated with the captured image, and may determine that other types of detection result is not associated with the captured image. The relay apparatus 101 decides whether the received detection result is associated with the captured image, according to the determinations.

In an exemplary embodiment, the relay apparatus 101 determines whether the frame received from the WSN 108 is the frame of the sensor data including the detection result to be associated with the captured image that is transmitted to the image data processing apparatus 102 by streaming. In a case where the relay apparatus 101 determines that the received frame includes the detection result to be associated with the captured image, the relay apparatus 101 changes the destination of the frame to the image data processing apparatus 102, and transfers the frame. In other words, since the captured image and the sensor data received by the image data processing apparatus 102 are passed through the relay apparatus 101, preprocessing of the association processing in the image data processing apparatus 102 can be performed by the relay apparatus 101. In contrast, in a case where the frame includes the detection result not to be associated with the captured image, the relay apparatus 101 changes the destination of the frame to the sensor data processing apparatus 109 and transfers the frame.

In an exemplary embodiment, the OpenFlow technology is applied to the above-described determination of the transfer destination for the relay apparatus 101 to be made by the sensor data processing apparatus 109 and the above-described change of the destination of the sensor data frame to be made by the relay apparatus 101.

In an exemplary embodiment, a function of the OpenFlow controller is mounted on the sensor data processing apparatus 109, and a function of the OpenFlow switch is mounted on the relay apparatus 101. As a result, the sensor data processing apparatus 109 defines and sets the setting relating to the transfer of the sensor frame by the relay apparatus 101, as the flow information of the OpenFlow technology.

The flow information of the OpenFlow technology includes a matching rule that is a condition to designate the frame to be transferred, and an action list that is a processing group to be executed as the transfer processing of the frame which adapts to the matching rule. Accordingly, in an exemplary embodiment, the matching rule of the flow information set by the sensor data processing apparatus 109 includes a condition to cause the relay apparatus 101 to determine whether the frame received from the WSN 108 is the frame of the sensor data including the detection result to be associated with the captured image. Further, the action list of the flow information set by the sensor data processing apparatus 109 includes processing of changing the destination of the frame to the image data processing apparatus 102. On the other hand, the matching rule of the other flow information includes a condition to cause the relay apparatus 101 to determine whether the frame received from the WSN 108 is the frame of the sensor data including the detection result not to be associated with the captured image. Moreover, the action list of the other flow information includes processing of changing the destination of the frame to the sensor data processing apparatus 109.

In addition thereto, in a case where the relay apparatus 101 receives, from the WSN 108, the frame including unknown sensor data not adapting to the flow information, the relay apparatus 101 may inquire of the sensor data processing apparatus 109 about a frame transfer processing method by using the OpenFlow technology. Further, to change the transfer destination and to suppress a transfer amount of the frame of the sensor data transferred to the LAN/WAN 107, the sensor data processing apparatus 109 may update the flow information held by the relay apparatus 101.

[Hardware Configuration of Relay Apparatus 101]

Figure 2:
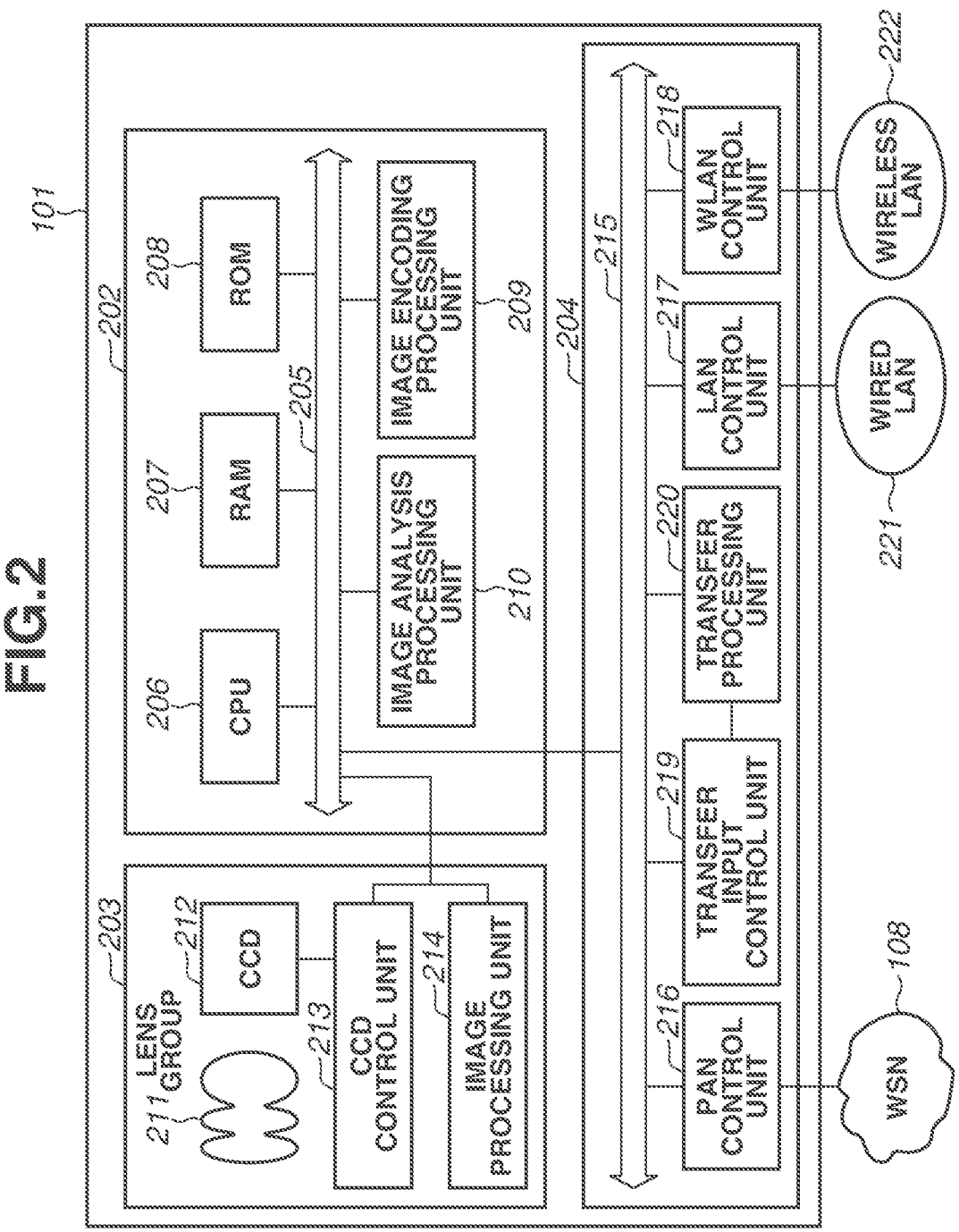
FIG. 2 is a hardware block diagram of a relay apparatus in the information processing system according to an exemplary embodiment.

Next, a hardware configuration of the relay apparatus 101 according to an exemplary embodiment is described with reference to FIG. 2. The relay apparatus 101 mainly includes, as the hardware configuration, a system unit 202, an imaging processing unit 203, and a communication processing unit 204.

The system unit 202 includes a system bus 205, a central processing unit (CPU) 206, a random access memory (RAM) 207, a read-only memory (ROM) 208, an image encoding processing unit 209 (hereinafter, encoding unit 209), and an image analysis processing unit 210 (hereinafter, analysis unit 210). The system bus 205 connects the CPU 206, the RAM 207, the ROM 208, the encoding unit 209, and the analysis unit 210 to one another, and transmits information. The CPU 206 controls the whole of the relay apparatus 101 with use of computer programs and data held by the RAM, 207 and the ROM 208. The programs executed by the CPU 206 include an operating system (OS), applications, a transmission control protocol/Internet protocol (TCP/IP) stack, and a PAN stack. The RAM 207 is a primary storage unit of the relay apparatus 101, and is used as a temporary storage region for execution of the programs by the CPU 206 and for input/output to/from the communication processing unit 204 and the imaging processing unit 203. The ROM 208 is a nonvolatile storage unit holding software programs to be executed by the CPU 206. The programs held by the ROM 208 are transferred to the RAM 207, and are read and executed by the CPU 206. The encoding unit 209 encodes digital image signal data generated by the imaging processing unit 203, into moving image data of a compression scheme such as Joint Photographic Experts Group (JPEG) and H.264. The analysis unit 210 includes a function of moving object detection, detection of a human body and a face and recognition of a human figure through image analysis, and executes image analysis processing of the digital signal image data generated by the imaging processing unit 203.

The imagine processing unit 203 includes a lens group 211, a charge-coupled device (CCD, or photoelectric conversion device) 212, a CCD control unit 213, and an image processing unit 214. The lens group 211 includes a plurality of lenses to optically project an object image to the CCD 212. The CCD 212 is a device that converts the image projected by the lens group 211 into an analog electric signal. The CCD control unit 213 includes a timing generator that supplies a transfer clock signal and a shutter signal to the CCD 212, and a circuit that performs noise reduction and gain processing of an output signal of the CCD 212. Further, the CCD control circuit 213 includes an analog-to-digital (A/D) conversion circuit that converts an analog signal into a digital signal. Moreover, the image processing unit 214 performs image processing such as gamma conversion, color space conversion, white balancing, and exposure correction, on the digital signal output from the CCD control unit 213. The digital signal subjected to the image processing is output to the RAM 207 as digital image signal data encodable by the encoding unit 209.

The communication processing unit 204 includes a local bus 215, a PAN control unit 216, a LAN control unit 217, a WLAN control unit 218, a transfer input control unit 219, and a transfer processing unit 220. The local bus 215 connects the PAN control unit 216, the LAN control unit 217, the transfer input control unit 219, and the transfer processing unit 220 to one another, and transmits information.

The PAN control unit 216 is a communication interface of the wireless PAN standard that is connected to the WSN 108, and executes transmission/reception of the transmission packet with the WSN 108. Further, the PAN control unit 216 performs connection control conforming to the wireless communication standard such as ZigBee (registered trademark) and Wi-SUN (registered trademark). In an exemplary embodiment, the relay apparatus 101 is connected to the WSN 108 including the mesh network configuration; however, the relay apparatus 101 may communicate with each of the sensors through peer-to-peer connection. In particular, in such a case, the PAN control unit 216 may conform to Bluetooth (registered trademark) standard.

The LAN control unit 217 is a communication interface that is connected to a wired LAN 221 included in the LAN/WAN 107, and performs transmission/reception of the transmission packet to/from the wired LAN 221. Further, the LAN control unit 217 includes a physical layer (PHY) of a transmission medium and a media access control (MAC) hardware circuit. For example, the wired LAN 221 to which the relay apparatus 101 is connected is Ethernet (registered trademark), the LAN control unit 217 corresponds to Ethernet (registered trademark) network interface card (NIC).

The WLAN control unit 218 is a communication interface that is connected to a wireless LAN 222 included in the LAN/WAN 107, and performs transmission/reception of the transmission packet to/from the wireless LAN 222. The WLAN control unit 218 includes a controller that controls wireless LAN such as IEEE802.11a/b/g/n/ac, and a radio frequency (RF) circuit.

The transfer input control unit 219 determines whether the frame received by the PAN control unit 216 from the WSN 108 should be regarded as a processing target of the transfer processing unit 220. The determination includes determination whether the frame includes the detection result of the sensor. Further, the frame that has been determined as the processing target as a result of the determination, is converted from a frame format of PAN standard into an Ethernet frame format that is processable by the transfer processing unit 220. Further, payload data of the frame is converted into IPv6 packet format. After the conversion processing, the frame is transferred to the transfer processing unit 220. The transfer input control unit 219 is described in detail below.

The transfer processing unit 220 is a functional unit that is mounted with the function of the OpenFlow switch and performs frame transfer processing. The target frame for the transfer processing includes a frame that is received by the PAN control unit 216 and provided through the transfer input control unit 219, and a frame that is transmitted from the TCP/IP protocol stack to be executed by the CPU 206. The transfer processing unit 220 analyzes the provided frame, checks the transfer condition of the frame, and executes processing relating to transfer of the frame. At this time, the transfer processing unit 220 sets header information (e.g., field of each of Ethernet header and IPv6 header) of the frame to be transferred to the LAN/WAN 107. Typically, a destination field of the IPv6 header information of the frame to be transferred is set. The processing carried out by the transfer processing unit is described in detail below.

In an exemplary embodiment, the hardware configuration in which the relay apparatus 101 includes the imaging processing unit 203 is assumed; however, the imaging processing unit 203 may be provided as a separate apparatus outside the relay apparatus 101. For example, a separate imaging apparatus may be connected to the relay apparatus 101 through an image signal cable, etc., and transmit acquired captured image data to the relay apparatus 101.

[Processing by Transfer Input Control Unit 219]

Figure 3:
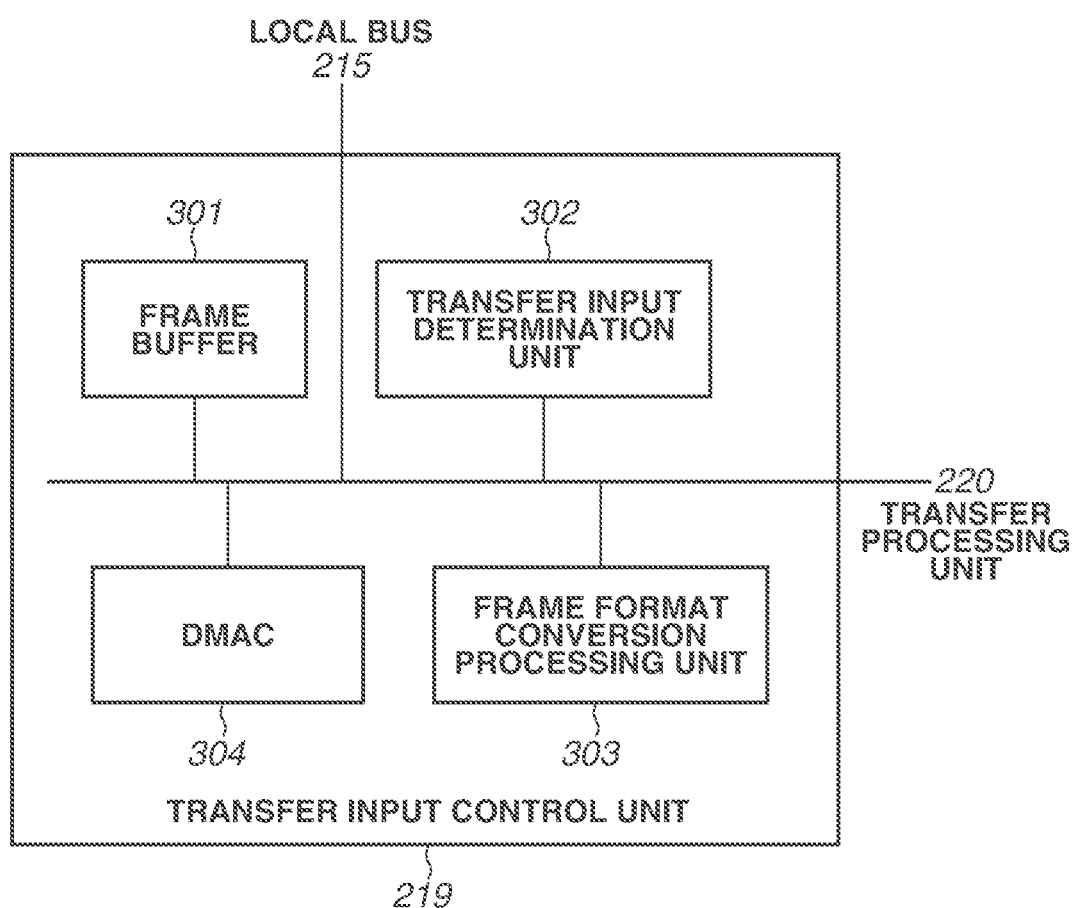
FIG. 3 is a hardware block diagram of a transfer input control unit in the information processing system according to an exemplary embodiment.

Next, the processing by the transfer input control unit 219 according to an exemplary embodiment is described. First, a detailed hardware configuration of the transfer input control unit 219 is described with reference to FIG. 3. The transfer input control unit 219 includes a frame buffer 301, a transfer input determination unit 302 (hereinafter, determination unit 302), a frame format conversion processing unit 303 (hereinafter, conversion unit 303), and a direct memory access controller (DMAC) 304. The frame buffer 301 is a buffer that stores the frame received by the PAN control unit 216 from the WSN 108, through the local bus 215. The determination unit 302 analyzes the frame held by the frame buffer 301, and determines whether the frame is to be provided to the transfer processing unit 220 and transferred. In a case where the determination unit 302 determines that the frame is a target of the transfer processing, the conversion unit 303 converts the format of the frame into an Ethernet frame format processable by the transfer processing unit 220, and converts the format of the payload of the frame into the format of the IPv6 packet. In the case where the determination unit 302 determines that the frame is the target of the transfer processing, the DMAC 304 transfers, by DMA, the frame in the frame buffer 301 to the transfer processing unit 220. In a case where the frame is not the target of the transfer processing, the DMAC 304 transfers the frame in the frame buffer 301 to the RAM 207 within the system unit 202.

Figure 5:
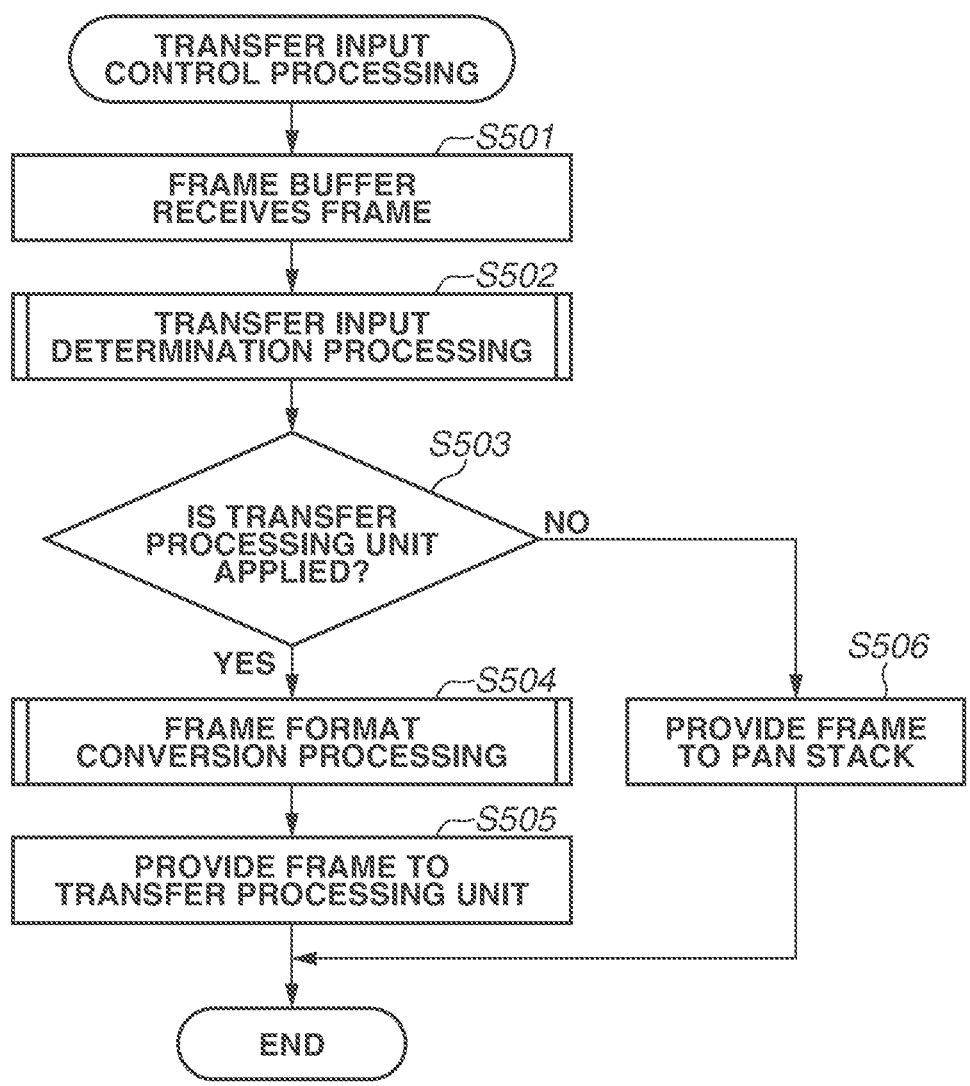
FIG. 5 is a flowchart illustrating processing by the transfer input control unit in the information processing system according to an exemplary embodiment.

Next, details of the frame transfer control processing by the transfer input control unit 219 according to an exemplary embodiment are described with reference to flowcharts of FIG. 5 to FIG. 7. FIG. 5 is a flowchart illustrating the entire frame transfer control processing. In step S501, the frame buffer 301 receives a frame from the PAN control unit 216. In step S502, the determination unit 302 analyzes the frame, and determines whether the frame is the target of the transfer processing by the transfer processing unit 220. Details of the processing in step S502 are described below with reference to FIG. 6. Next, in step S503, it is determined whether to apply processing to be performed by a transfer processing unit, based on a result of the determination in step S502. In a case where the processing proceeds from step S503 to a branch where the frame transfer processing is executed (YES in step S503), the frame format conversion processing is executed in step S504. In step S504, the conversion unit 303 converts the format of the frame into the format of Ethernet frame and the format of IPv6 packet. Details of the conversion processing in step S504 are described below with reference to FIG. 7. In step S505 in a downstream side of step S504, the DMAC 304 transfers, by DMA, the frame in the frame buffer 301 to the transfer processing unit 220. In a case where the processing proceeds from step S503 to a branch where the frame transfer processing is nor executed (NO in step S503), the processing proceeds to step S506. In step S506, the DMAC 304 transfers the frame in the frame buffer 301 to the RAM 207 of the system unit 202. The frame transferred to the RAM 207 is subjected to the processing of the PAN stack by the CPU 206.

Figure 6:
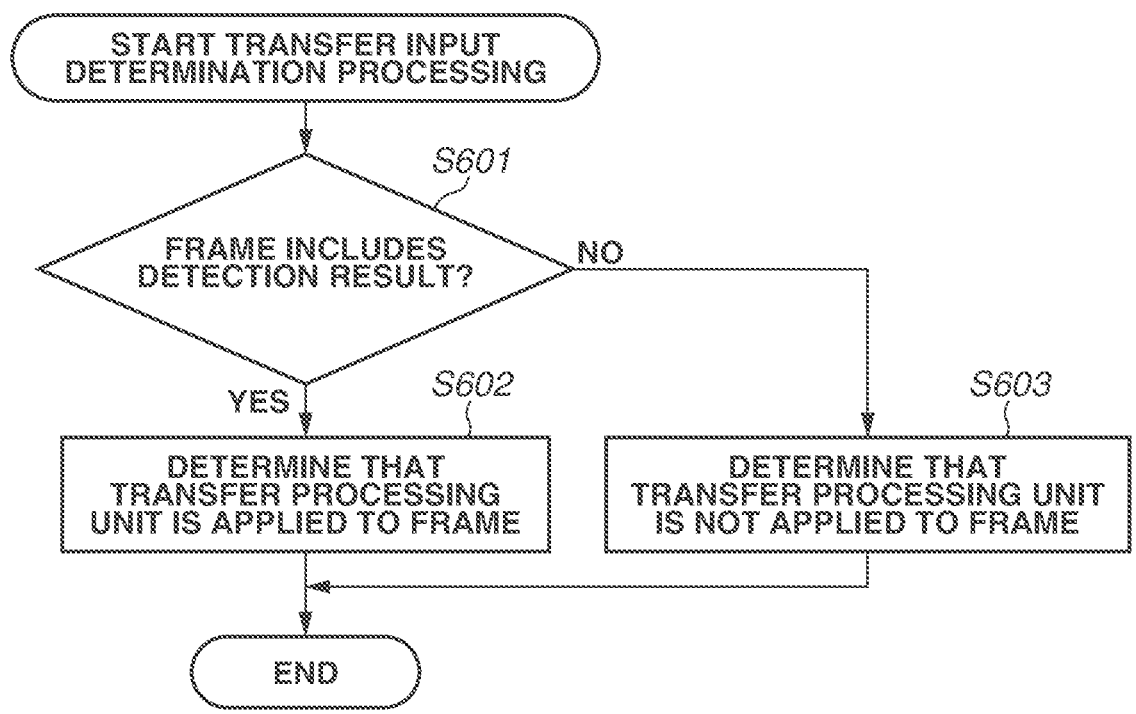
FIG. 6 is a flowchart of transfer input determination processing described in a first exemplary embodiment.

FIG. 6 is a flowchart illustrating the processing of determining whether the frame is to be regarded as the target of the transfer processing, which is executed by the determination unit 302 in step S502 of FIG. 5. In step S601, the frame held by the frame buffer 301 is analyzed to confirm whether the frame includes the detection result that includes at least one of the information indicating detection of a predetermined event by the sensors 103 to 106 or numerical values obtained from the measurement. In a case where it is confirmed that the frame includes the detection result (YES in step S601), the processing proceeds to step S602, and the frame is determined as the target of the transfer processing. In a case where the frame does not include the detection result (NO in step S601), the processing proceeds to step S603, and the frame is not determined as the target of the transfer processing.

In the transfer input determination processing according to an exemplary embodiment, application of the processing by the transfer processing unit is determined based on whether the frame includes the detection result. Alternatively, application of the processing through the transfer processing unit may be determined by further performing analysis of the detection result included in the frame. For example, in a case where the frame includes the detection result that is used by an application to be executed by the CPU 206 or the image processing unit 214, it is determined that the processing by the transfer processing unit is not applied, and the frame is transferred to the RAM 207. More specifically, in a case where the detection result that includes a measurement value of an illuminance sensor is received from the WSN 108, it may be determined that the processing by the transfer processing unit is not applied, and the image processing unit 214 may refer to the measurement value included in the frame transferred to the RAM 207, to reflect the measurement value in the image processing.

Further, a case can is conceivable where the detection result included in the frame is transferred to the image data processing apparatus 102 or the sensor data processing apparatus 109 after the detection result is used in the processing of any application. In this case, processing of the TCP/IP protocol stack is applied to the detection result included in the frame transferred to the RAM 207, to generate a transmission frame, and the transfer processing is then executed.

Figure 7:
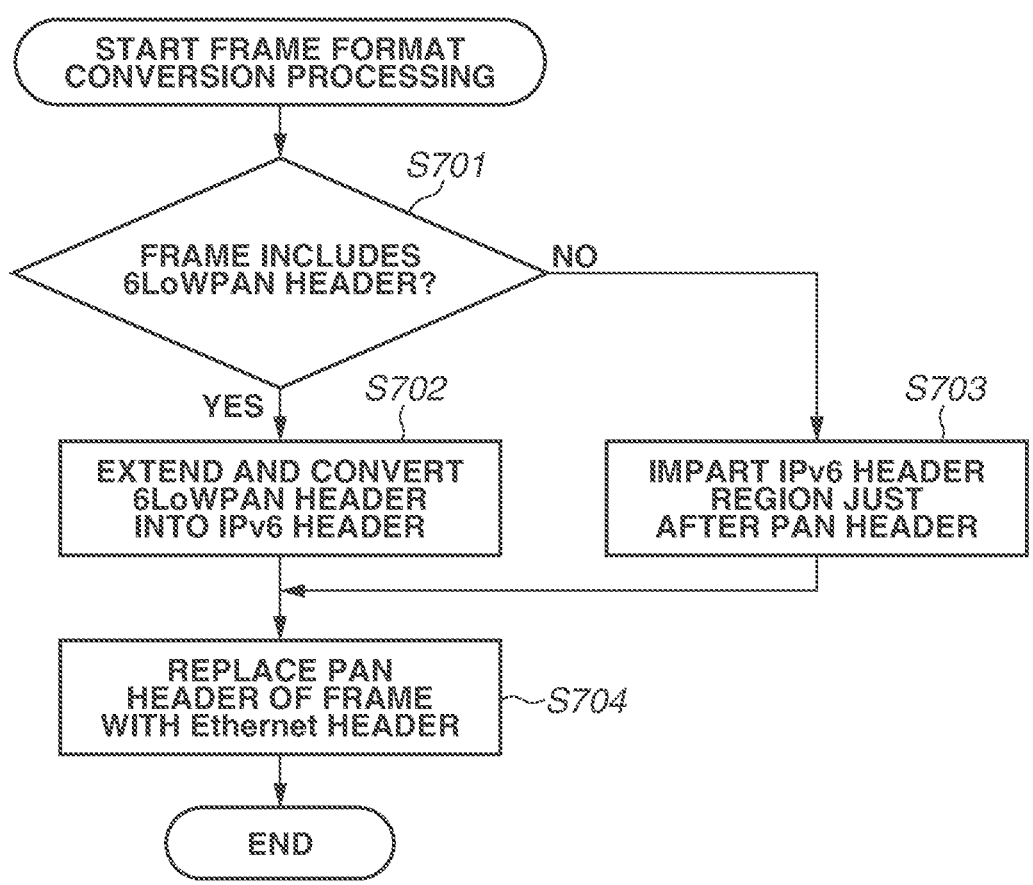
FIG. 7 is a flowchart of frame format conversion processing described in the first exemplary embodiment.

Next, FIG. 7 is a flowchart illustrating the processing of converting the format of the frame, which is executed by the conversion unit 303 in step S504 of FIG. 5. Further, FIGS. 8A to 8D are diagrams illustrating a transformation process of the frame format when the frame format conversion processing is applied. In the following, description is given while a header of the frame that has been generated based on the communication standard of the WSN 108 is referred to as a PAN header.

Figure 8A:
FIGS. 8A to 8D are diagrams illustrating processes of frame format conversion through the frame format conversion processing described in the first exemplary embodiment.
Figure 8B:
Figure 8C:
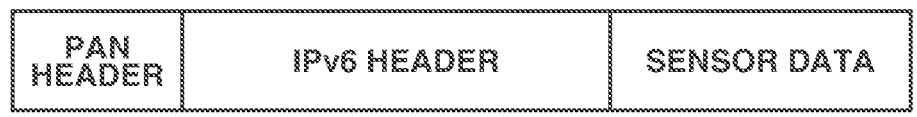
Figure 8D:
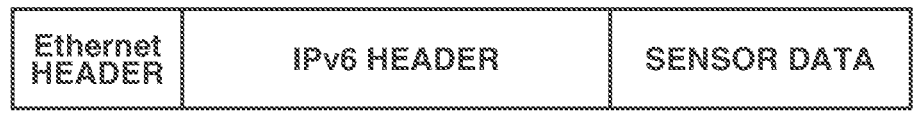

In step S701 of FIG. 7, it is confirmed whether the frame held by the frame buffer 301 includes a 6LoWPAN header in the payload. In a case where the frame includes a 6LoWPAN header as illustrated in FIG. 8A (YES in step S701), processing of header extension based on 6LoWPAN protocol is performed in order to convert the 6LoWPAN header into IPv6 packet. At this time, in a case where the 6LoWPAN header includes a fragment header provided by the 6LoWPAN protocol, the conversion into the IPv6 packet may be performed after the fragment packet is all received. In a case where the frame does not include the 6LoWPAN header as illustrated in FIG. 8B (NO in step S701), a region of the IPv6 header is imparted just after the PAN header in step S703 in order to process the frame as the IPv6 packet by the frame transfer processing unit 220. At this time, when the processing in step S702 or S703 is performed, in either case the frame is put into a state where the region of the IPv6 header is secured just after the PAN header as illustrated in FIG. 8C. Next, in step S704, the processing of replacing the PAN header with Ethernet header is performed, which results in a format as illustrated in FIG. 8D. At this time, regions of the Ethernet header and the IPv6 header of the frame illustrated in FIG. 8D are simply secured, and a value is not necessarily provided in a field of each header. For the header field where no value is provided at this time, a value is provided in the processing by the transfer processing unit 220 based on the action list of the flow information.

It is assumed that, in the frame format conversion processing according to an exemplary embodiment, the format of the frame is converted into the Ethernet format, and the format of the payload of the frame is converted into the IPv6 packet format; however, any frame format conversion processing can be adopted as long as the frame format is converted into a format that is processable by the transfer processing unit 220. For example, the conversion processing, which converts the format of the payload of the frame into IPv4 packet format may be adopted.

[Processing by Transfer Processing Unit 220]

Figure 4:
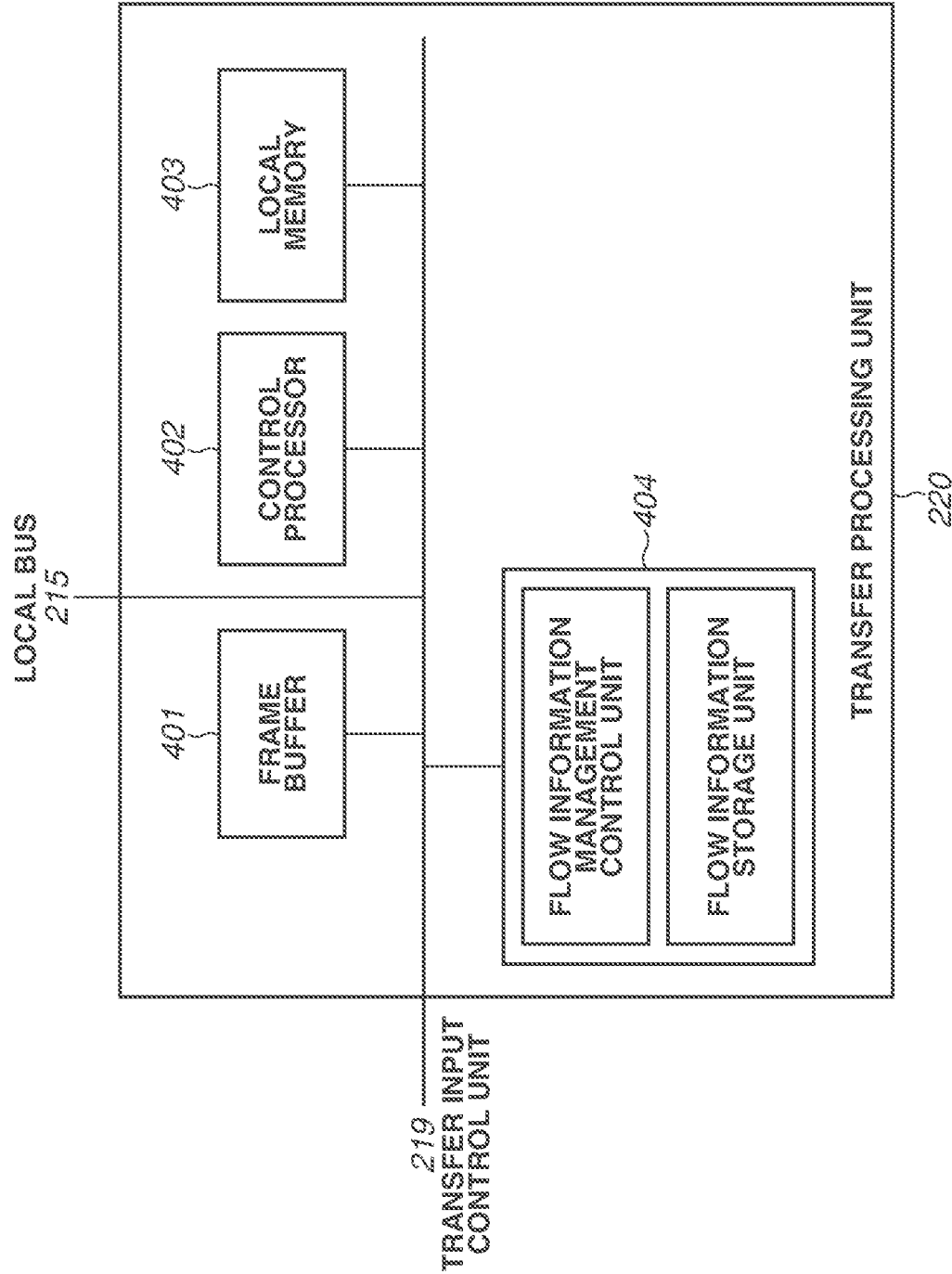
FIG. 4 is a hardware block diagram of a transfer processing unit in the information processing system according to an exemplary embodiment.

Next, the processing by the transfer processing unit 220 according to an exemplary embodiment is described with reference to FIG. 4. FIG. 4 is a block diagram illustrating an example of a hardware configuration of the transfer processing unit 220. The transfer processing unit 220 includes a frame buffer 401, a control processor 402, a local memory 403, and a flow information management unit 404 (information management unit 404). The control processor 402 is a processor that executes the transfer processing of the transfer processing unit 220. The local memory 403 stores programs to be executed by the control processor 402, and is used as a temporary data storage region during execution of the programs. The flow information management unit 404 manages the flow information for determination of transfer processing contents of the input frame. As illustrated in FIG. 4, the flow information management unit 404 includes a flow information management control unit and a flow information storage unit. The flow information storage unit is a memory that holds data of the flow information, and the flow information management control unit is a hardware logic circuit that includes functions of registration, deletion, updating, and searching of the flow information with respect to the flow information storage unit.

As described above, the sensor data processing apparatus 109 sets the flow information in the OpenFlow technology to the relay apparatus 101 according to an exemplary embodiment. The relay apparatus 101 registers the set flow information in the flow information management unit 404 to manage the flow information. More specifically, the CPU 206 executes OpenFlow communication processing, receives instructions of setting and changing of the flow information, and writes instruction data into the local memory 403. Then, the control processor 402 controls the flow information management unit 404 to perform registration, updating, etc. of the flow information, according to the instruction data.

Further, as described above, the transfer input control unit 219 converts the format of the frame received from the PAN control unit 216 into the frame format processable by the transfer processing unit 220. Then, the transfer input control unit 219 writes the converted frame into the frame buffer 401 in the transfer processing unit 220 through DMA transfer. Alternatively, the transmission frame generated by the TCP/IP protocol stack that is executed by the CPU 206 may be provided to the transfer processing unit 220, and the transfer processing unit 220 may execute the transfer processing of the transmission frame. Also in this case, the transmission flame is written into the frame buffer 401.

The transfer processing unit 220 performs the transfer processing on the input frame written in the frame buffer 401. As a result, the input frame is completed as frame data that is transmittable by the LAN control unit 217 or the WLAN control unit 218, and is transmitted to either the wired LAN 221 or the wireless LAN 222.

The flow of the transfer processing by the transfer processing unit 220 is described. First, the control processor 402 analyzes the header information and the data format of the payload, etc. of the input frame to extract various kinds of parameters included in the matching rule of the flow information. The control processor 402 operates the flow information management unit 404 to search the flow information with use of a set of parameters extracted from the input frame. In a case where the flow information is identified as a result of the search, the control processor 402 performs the processing indicated by the action list of the identified flow information. At this time, for example, the processing of changing the destination of the frame is executed. Finally, the transfer processing unit 220 transfers the frame from the frame buffer 401 to the LAN control unit 217 or the WLAN control unit 218 according to the designation of the communication interface of the transfer destination included in the flow information.

In a case where no flow information that includes the matching rule adapting to the input frame is registered in the flow information management unit 404, the search has not found the flow information is not found as its result. In such a case, the input frame may not be transferred and may be discarded. Alternatively, notification to the CPU 206 is performed, and the CPU 206 may inquire of the sensor data processing apparatus 109 about the flow information through the OpenFlow communication.

The processing by the relay apparatus 101 according to an exemplary embodiment is additionally described here with reference to FIG. 9. FIG. 9 is a functional block (unit) diagram illustrating a configuration of functions relating to the communication processing by the relay apparatus 101. The relay apparatus 101 includes functions of a PAN control processing unit 901, a LAN control processing unit 902, a transfer input control processing unit 903 (input unit), a PAN stack processing unit 904, a transfer processing unit 905, a TCP/IP protocol processing unit 906, and an application processing unit 907. The frame received by the PAN control unit 216 of FIG. 2 is subjected to processing of the PAN control processing unit 901, and is then subjected to processing of the transfer input control processing unit 903. The transfer input control processing unit 903 first performs the transfer input determination processing in step S502 of FIG. 5, to determine whether the frame is to be provided to the transfer processing unit 905 or the PAN stack processing unit 904. In a case where processing of the transfer processing unit 905 is applied to the frame, the frame format conversion processing in step S504 of FIG. 5 is applied to the frame, and the transfer processing unit 220 then performs the transfer processing on the frame based on the flow information in the OpenFlow technology. In a case where processing of the PAN stack processing unit 904 is applied to the frame, processing of the PAN protocol based on the communication standard of the WSN 108 is applied to the frame. Thereafter, in a case where the frame includes data such as the detection result, processing of the application processing unit 907 is applied to the frame, and the processing of the transfer processing unit 905 is performed on the frame through the TCP/IP protocol stack processing unit 906 as necessary.

According to an exemplary embodiment, the relay apparatus 101 can transfer the frame received from the WSN 108 with use of the OpenFlow technology. As a result, it is possible to perform flexible transfer control such that the transfer destination of the reception frame is changed based on information such as the type of the sensor data and the transmission source of the sensor data. Further, since the transfer processing can be carried out with use of the flow information set by the sensor data processing apparatus 109, it is possible to control the transfer amount according to a load state of the LAN/WAN 107 as the transfer destination or to change the transfer destination according to the analysis result of the image and the sensor data obtained by the image data processing apparatus 102 and the sensor data processing apparatus 109. Furthermore, the input determination processing is performed before the frame is provided to the transfer processing unit 220 that includes the function of the OpenFlow switch, so that only the frame including the sensor data can be input into the OpenFlow switch and other frames are processed by the PAN stack. As a result, it is possible to perform the transfer processing by the OpenFlow technology while performing the PAN protocol processing necessary to control the connection with the WSN 108.

As described above, an exemplary embodiment makes it possible to transfer the reception frame received from the sensor network with use of the OpenFlow technology. Therefore, it is possible to perform flexible transfer control such that the transfer destination of the reception frame is changed based on information such as the type of the sensor data held by the reception frame and the transmission source of the sensor data. Further, the transfer destination is controllable by the OpenFlow controller, which enables the change of the transfer amount and the transfer destination according to the load state of the network or a server apparatus as the transfer destination of the sensor data. Furthermore, the input determination is performed before the frame is provided to the OpenFlow switch, so that only the frame including the sensor data can be input into the OpenFlow switch and the frame necessary to control the connection with the sensor network is processed by the PAN stack. As a result, it becomes possible to perform the transfer processing by the OpenFlow technology while performing the wireless PAN protocol processing necessary to control the connection with the sensor network.

A second exemplary embodiment is described below with reference to drawings. The configuration of the system and the hardware configuration of the relay apparatus 101 according to an exemplary embodiment are the same as those in the first exemplary embodiment described with reference to FIGS. 1 to 4, and description thereof is therefore omitted. Further, in an exemplary embodiment, the processing by the determination unit 302 inside the transfer input control unit 219 described in the first exemplary embodiment is performed with use of a determination processing method different from that in the first exemplary embodiment. In addition, the processing by the transfer input control unit 219 described with reference to FIG. 5 and the processing by the frame format conversion processing unit 303 described with reference to FIG. 7 are performed with use of the methods similar to those in the first exemplary embodiment, and description thereof is therefore omitted.

FIG. 10 is a flowchart illustrating the transfer input determination processing according to an exemplary embodiment, which is executed by the determination unit 302 in step S502 of FIG. 5. In step S1001, the frame held by the frame buffer 301 is analyzed to confirm whether the payload of the frame includes the 6LoWPAN packet. In a case where the payload of the frame includes the 6LoWPAN packet (YES in step S1001), the processing proceeds to step S1002, and the 6LoWPAN packet is further analyzed. In a case where the frame does not include the 6LoWPAN packet (NO in step S1001), the processing proceeds to step S1004, and the frame is determined not to be the target of the transfer processing. In the analysis processing in step S1002, it is confirmed whether the 6LoWPAN packet includes the header information that is to be processed by the TCP/IP protocol stack executed by the CPU 206. Examples of the header information to be processed by the TCP/IP protocol stack include a routing header and a Hop-by-Hop Options header included in the IPv6 extension header. It is necessary to process the Hop-by-Hop Options header in all of apparatuses that relay the packet, based on the IPv6 standard. In addition, the routing header is a header in which relay apparatuses of the IPv6 packet are listed. In a case where the relay apparatus 101 is designated as one of the relay apparatuses, it is necessary to process the routing header. Therefore, in a case where any of these headers is included in the 6LoWPAN packet (YES in step S1002), the processing proceeds to step S1004 in order to perform the IPv6 processing in the TCP/IP stack, and the frame is determined not to be the target of the transfer processing. In a case where the 6LoWPAN packet does not include the header information to be processed by the TCP/IP protocol stack (NO in step S1002), the processing proceeds to step S1003, and the frame is determined to be the target of the transfer processing.

In an exemplary embodiment, the PAN protocol processing and the processing of converting the 6LoWPAN packet into the IPv6 packet are applied in the PAN stack processing unit 904 in FIG. 9, to the frame that has been determined not to be the target of the transfer processing in step S1004 through step S1002. Thereafter, the processing by the TCP/IP protocol stack processing unit 906 is applied to the IPv6 packet. At this time, routing processing of an IP layer may be applied to the IPv6 packet. In this case, the TCP/IP protocol stack processing unit 906 generates a transmission frame from the IPv6 packet, and the processing is executed by the transfer processing unit 905.

When an exemplary embodiment is used, only the frame including the 6LoWPAN packet in the payload becomes the target of the transfer processing. Therefore, in the frame format conversion processing described in FIG. 7 according to the first exemplary embodiment, the processing in step S702 is applied to the frame, and the 6LoWPAN header of the payload of the frame is accordingly extended and converted into the IPv6 header. This means that a value is provided to each field of the IPv6 header when the frame is provided to the transfer processing unit 220. As a result, it becomes possible to set, as the transfer condition of the frame, the information of the IPv6 header to the matching rule of the flow information held by the flow information management unit 404, and to perform more flexible transfer control. On the other hand, in a case where the 6LoWPAN packet includes the header information to be processed by the TCP/IP protocol stack, the frame is not provided to the transfer processing unit 220. Therefore, even in a case where the IPv6 packet transmitted from the sensors 103 to 106 includes additional information such as route information, it is possible to appropriately perform the relay processing of the packet.

A third exemplary embodiment is described below with reference to drawings. The configuration of the system and the hardware configuration of the relay apparatus 101 according to an exemplary embodiment are the same as those in the first exemplary embodiment described with reference to FIGS. 1 to 4, and description thereof is therefore omitted. Further, n an exemplary embodiment, the processing in the determination unit 302 and the processing in the conversion unit 303 inside the transfer input control unit 219 described in the first exemplary embodiment are performed in a determination procedure different from the first exemplary embodiment.

Figure 11:
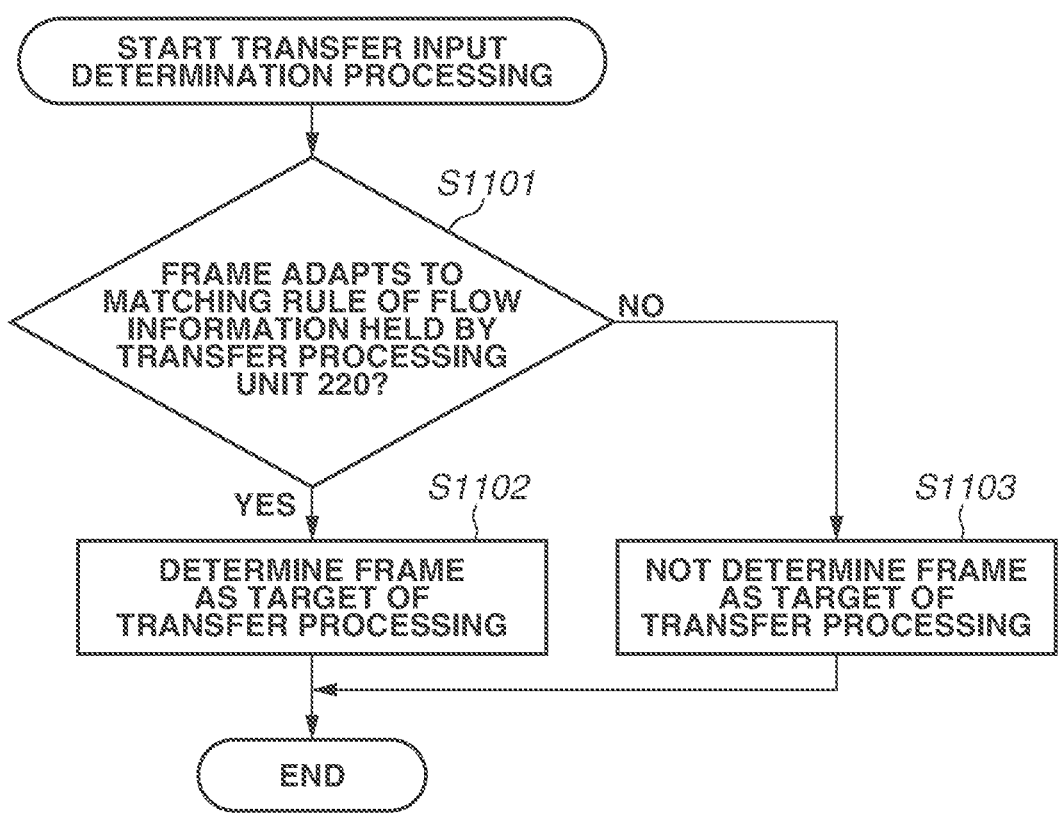
FIG. 11 is a flowchart of transfer input determination processing described in a third exemplary embodiment.

FIG. 11 is a flowchart illustrating the transfer input determination processing according to an exemplary embodiment, which is executed by the determination unit 302 in step S502 of FIG. 5. In step S1101, the flow information management unit 404 inside the transfer processing unit 220 is accessed, and it is determined whether the reception frame held by the frame buffer 401 adapts to the matching rule held by the flow information. In a case where there is the flow information that includes the matching rule, to which the frame (YES in step S1101) adapts, the processing proceeds to step S1102, and the frame is determined to be the target of the transfer processing. Otherwise (NO in step S1101), the processing proceeds to step S1103, and the frame is determined not to be the target of the transfer processing. As the comparison processing between the frame and the matching rule in step S1101, for example, a configuration to confirm whether the frame adapts to the matching rule referring to the transmission source of the frame and the information of the detection result included in the payload of the frame, is conceivable. Further, the transmission input determination processing may be configured to compare the frame with only information, of a part of the matching rule. For example, even in a case where the matching rule includes a condition that the transmission source of the frame is compared with the information of the detection result included in the payload of the frame, only the transmission source of the reception frame may be confirmed, and the data included in the payload may not be confirmed.

Figure 13A:
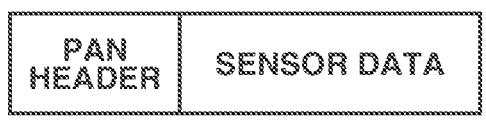
FIGS. 13A to 13C are diagrams illustrating processes of frame format conversion through the frame format conversion processing described in the third exemplary embodiment.
Figure 13B:
Figure 13C:
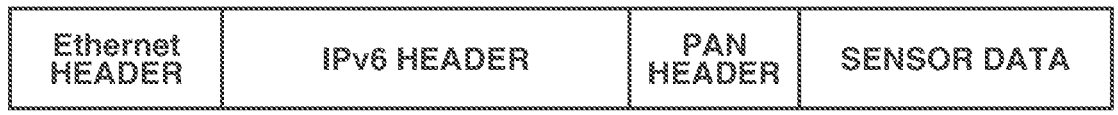

Next, FIG. 12 is a flowchart of the frame format conversion processing according to an exemplary embodiment, which is executed by the conversion unit 303 in step S504 of FIG. 5. Further, FIGS. 13A to 13C are diagrams illustrating a transformation process of the frame format conversion when the frame format conversion processing according to an exemplary embodiment is applied.

In step S1201 of FIG. 12, the frame held by the frame buffer 301 is analyzed to determine whether the payload of the frame includes information other than the detection result. In a case where the payload of the frame includes information other than the detection result (YES in step S1201), the processing proceeds to step S1202, and the frame format conversion processing of FIG. 7 described in the first exemplary embodiment is applied. On the other hand, in a case where the payload includes only the detection result (NO) in step S1201), the processing proceeds to step S1203, and processing of imparting an IPv6 header region is performed. At this time, in a case where the frame held by the frame buffer 301 includes a format as illustrated in FIG. 13A, the frame comes into a state as illustrated in FIG. 13B through the processing in step S1203. Next, in step S1204, processing of imparting an Ethernet header region at a head of the IPv6 header region is further performed. The frame comes into a state as illustrated in FIG. 13C through the processing. The respective regions of the Ethernet header and the IPv6 header of the frame illustrated in FIG. 13C are simply secured similar to the first exemplary embodiment, and a value is not necessarily provided to a field of each header. As to the header field where no value is provided at this time, a value is provided through the processing by the transfer processing unit 220, based on the action list of the flow information.

When an exemplary embodiment is applied, it becomes possible to previously determine whether the reception frame becomes the target of the transfer processing by the transfer processing unit 220. Therefore, it is possible to omit the processing of providing to the conversion unit 303 and the transfer processing unit 220 the frame that is not the target of the transfer processing by the transfer processing unit 220. Further, the reception frame is encapsulated in the IPv6 packet and the Ethernet frame by adopting the processing procedure of FIG. 12 in the frame format conversion processing. As a result, for example, even in a case where the payload of the frame transmitted from the sensors 103 to 106 includes only the detection result when the information other than the detection result is also analyzed together by the image data processing apparatus 102 and the sensor data processing apparatus 109, the apparatus at the transfer destination of the frame can refer to the information of the PAN header. Since the PAN header may include information such as a PAN identifier, the transmission source, and the destination in some cases, it is possible to acquire additional information of the detection result, and the apparatus at the transfer destination can execute more detailed analysis processing. In an exemplary embodiment, the branching is conditional on whether the payload of the reception frame includes information other than the detection result; however, the branching may be performed based on a condition that the payload does not include information necessary for analysis by the apparatus at the transfer destination of the frame, or a condition that the PAN header includes information not included in the payload of the frame.

Embodiments of the present invention can be realized by any combination of the above-described first to third exemplary embodiments. For example, the determination condition described in the second exemplary embodiment and the third exemplary embodiment may be added to the transfer input determination processing executed in step S502 of FIG. 5 described in the first exemplary embodiment.

According to the above-described first to third exemplary embodiments, it is possible to convert a frame format of a data frame received from a network conforming to a first communication scheme, into a frame format of a second network conforming to a different communication scheme, and to transfer the data frame according to a transfer rule applicable to the frame of the frame format.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the has above has been described with reference to exemplary embodiments, it is to be understood that the embodiments are limited to the disclosed exemplary embodiments. The scope of the following claims is to be accorded the broadest interpretation so as to encompass all such modifications and equivalent structures and functions.

This application claims the benefit of Japanese Patent Application No. 2017-176091, filed Sep. 13, 2017, which is hereby incorporated by reference herein in its entirety.

What is claimed is:

1. A communication apparatus, comprising:
one or more processors; and
one or more memories including instructions that, when executed by the processor(s), cause the apparatus to:
receive a data frame of a frame format different from a frame format conforming to Ethernet;
determine whether to perform OpenFlow control on the received data frame;
convert the frame format of the received data frame into the frame format conforming to Ethernet in a case where it is determined that the OpenFlow control is performed,
wherein the communication apparatus does not convert the frame format of the received data frame into the frame format conforming to Ethernet in a case where it is determined that the OpenFlow control is not performed; and
perform, on the data frame of the frame format converted into the frame format conforming to Ethernet, the OpenFlow control to perform transfer processing based on a predetermined transfer rule.

2. The communication apparatus according to claim 1, wherein the frame format different from the frame format conforming to Ethernet is a frame format conforming to internet protocol version 6 over low-power wireless personal area networks (6LoWPAN) standard.

3. The communication apparatus according to claim 1, wherein the communication apparatus receives the data frame of the frame format different from the frame format conforming to Ethernet from a first network, and
wherein the communication apparatus transfers the data frame of the frame format converted into the frame format conforming to Ethernet through the OpenFlow control, to a second network different from the first network.

4. The communication apparatus according to claim 3, wherein the second network is a network that performs communication conforming to a communication scheme of Ethernet and internet protocol (IP).

5. The communication apparatus according to claim 1, wherein, in the case where it is determined that the OpenFlow control is not performed, the communication apparatus provides the received data frame to a protocol stack.

6. The communication apparatus according to claim 5, wherein, in a case where it is determined that the OpenFlow control is not performed and the received data frame includes a 6LoWPAN packet in a payload, the communication apparatus provides the received data frame to the protocol stack.

7. The communication apparatus according to claim 1, wherein the communication apparatus determines whether to perform the OpenFlow control, based on whether the received data frame includes sensor data.

8. The communication apparatus according to claim 1, wherein the communication apparatus determines whether to perform the OpenFlow control, based on whether the received data frame includes a 6LoWPAN packet in the payload and includes specific header information.

9. The communication apparatus according to claim 1, wherein the communication apparatus further converts a format of a payload of the received data frame into a format of an IPv6 packet.

10. A method of controlling a communication apparatus, the method comprising:
receiving a data frame of a frame format different from a frame format conforming to Ethernet;
determining whether to perform OpenFlow control on the received data frame;
converting the frame format of the received data frame into the frame format conforming to Ethernet in a case where it is determined that the OpenFlow control is performed,
wherein the communication apparatus does not convert the frame format of the received data frame into the frame format conforming to Ethernet in a case where it is determined that the OpenFlow control is not performed; and
performing, on the data frame of the frame format converted into the frame format conforming to Ethernet, the OpenFlow control to perform transfer processing based on a predetermined transfer rule.

11. A non-transitory computer-readable storage medium storing a computer program for causing a computer to execute a method of controlling a communication apparatus, the method comprising:
receiving a data frame of a frame format different from a frame format conforming to Ethernet;
determining whether to perform OpenFlow control on the received data frame;
converting the frame format of the received data frame into the frame format conforming to Ethernet in a case where it is determined that the OpenFlow control is performed,
wherein the communication apparatus does not convert the frame format of the received data frame into the frame format conforming to Ethernet in a case where it is determined that the OpenFlow control is not performed; and
performing, on the data frame of the frame format converted into the frame format conforming to Ethernet, the OpenFlow control to perform transfer processing based on a predetermined transfer rule.

* * * * *